(12) United States Patent  
Sumioka et al.

(10) Patent No.: US 9,325,016 B2  
(45) Date of Patent: Apr. 26, 2016

(54) POROUS ELECTRODE SUBSTRATE AND PROCESS FOR PRODUCTION THEREOF, POROUS ELECTRODE SUBSTRATE PRECURSOR SHEET, MEMBRANE-ELECTRODE ASSEMBLY, AND POLYMER ELECTROLYTE FUEL CELL

(75) Inventors: Kazuhiro Sumioka, Aichi (JP); Yoshihiro Sako, Hiroshima (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 282 days.

(21) Appl. No.: 13/882,842

(22) PCT Filed: Oct. 26, 2011

(86) PCT No.: PCT/JP2011/074671  
§ 371 (c)(1), (2), (4) Date: May 1, 2013

(87) PCT Pub. No.: WO2012/060258  
PCT Pub. Date: May 10, 2012

(65) Prior Publication Data  
US 2013/0224625 A1    Aug. 29, 2013

(30) Foreign Application Priority Data  
Nov. 1, 2010  (JP) .................................. 2010-245133

(51) Int. Cl.  
*H01M 4/86* (2006.01)  
*C04B 35/83* (2006.01)  
(Continued)

(52) U.S. Cl.  
CPC ............. *H01M 4/8657* (2013.01); *B32B 18/00* (2013.01); *C04B 35/83* (2013.01); *D21H 13/50* (2013.01);  
(Continued)

(58) Field of Classification Search  
CPC ......................................................... H01M 4/86  
See application file for complete search history.

(56) References Cited

U.S. PATENT DOCUMENTS 6,489,051 B1 * 12/2002 Inoue ..................... D21H 13/50  
429/212  
2002/0175073 A1   11/2002 Nakamura et al.  
(Continued)

FOREIGN PATENT DOCUMENTS

CA    2 751 292 A1    8/2010  
EP    2 506 353 A1   10/2012  
(Continued)

OTHER PUBLICATIONS

JP 2009-129634 MT.*  
(Continued)

*Primary Examiner* — Patrick Ryan  
*Assistant Examiner* — Alex Usyatinsky  
(74) *Attorney, Agent, or Firm* — Oblon, McClelland, Maier & Neustadt, L.L.P

(57) ABSTRACT

Provided are: a porous electrode substrate which has excellent handling properties and surface smoothness and satisfactory gas permeability and electrical conductivity, and enables the reduction of damage to a polymer electrolyte membrane when integrated into a fuel cell; and a process for producing the porous electrode substrate. Specifically provided are: a porous electrode substrate comprising a three-dimensional structure (Y-1) produced by bonding short carbon fibers through carbon and a three-dimensional structure (Y-2) produced by bonding short carbon fibers through carbon, wherein the three-dimensional structures (Y-1) and (Y-2) are layer stacked on and integrated with each other, the short carbon fibers form a three-dimensional entangled structure in the structure (Y-1), and the short carbon fibers do not form a three-dimensional entangled structure in the structure (Y-2); a process for producing the electrode base material; a precursor sheet for producing the electrode base material; a membrane-electrode assembly which involves the electrode base material; and a polymer electrolyte fuel cell.

13 Claims, 8 Drawing Sheets

(51) Int. Cl.
  *D21H 13/50* (2006.01)
  *D21H 27/00* (2006.01)
  *H01M 4/88* (2006.01)
  *H01M 4/96* (2006.01)
  *H01M 8/02* (2006.01)
  *B32B 18/00* (2006.01)

(52) U.S. Cl.
  CPC ............ *D21H 27/00* (2013.01); *H01M 4/8605* (2013.01); *H01M 4/8626* (2013.01); *H01M 4/8803* (2013.01); *H01M 4/8875* (2013.01); *H01M 4/8885* (2013.01); *H01M 4/96* (2013.01); *H01M 8/0234* (2013.01); *H01M 8/0245* (2013.01); *C04B 2235/526* (2013.01); *C04B 2235/5264* (2013.01); *C04B 2235/5268* (2013.01); *C04B 2235/5272* (2013.01); *C04B 2235/602* (2013.01); *C04B 2235/652* (2013.01); *C04B 2235/663* (2013.01); *C04B 2237/385* (2013.01); *C04B 2237/584* (2013.01); *Y02E 60/50* (2013.01); *Y02P 70/56* (2015.11)

(56) References Cited

U.S. PATENT DOCUMENTS

| | | |
|---|---|---|
| 2003/0027471 A1 | 2/2003 | Shimazaki et al. |
| 2005/0150620 A1 | 7/2005 | Hamada et al. |
| 2006/0166075 A1* | 7/2006 | Inoue et al. ............... 429/44 |
| 2007/0218346 A1 | 9/2007 | Ji et al. |
| 2008/0038589 A1 | 2/2008 | Nakamura et al. |
| 2010/0279177 A1* | 11/2010 | Yang .............................. 429/400 |
| 2011/0294036 A1 | 12/2011 | Sumioka et al. |
| 2012/0100456 A1 | 4/2012 | Sumioka et al. |
| 2012/0115063 A1 | 5/2012 | Sumioka et al. |
| 2012/0141911 A1 | 6/2012 | Sumioka et al. |

FOREIGN PATENT DOCUMENTS

| | | | |
|---|---|---|---|
| JP | 9 97612 | | 4/1997 |
| JP | 2001 216973 | | 8/2001 |
| JP | 2003 45443 | | 2/2003 |
| JP | 2003 234106 | | 8/2003 |
| JP | 2004 220843 | | 8/2004 |
| JP | 2007 273466 | | 10/2007 |
| JP | 2009 4102 | | 1/2009 |
| JP | 2009-129634 | * | 6/2009 |
| JP | 2009-295509 A | | 12/2009 |
| WO | 01 56103 | | 8/2001 |
| WO | 02 42534 | | 5/2002 |

OTHER PUBLICATIONS

U.S. Appl. No. 13/980,774, filed Jul. 19, 2013, Sumioka, et al.
Extended European Search Report issued Mar. 11, 2014 in Patent Application No. 11837908.0.
International Search Report Issued Feb. 14, 2012 in PCT/JP11/74671 Filed Oct. 26, 2011.
U.S. Appl. No. 13/892,561, filed May 13, 2013, Sumioka, et al.

* cited by examiner

20μm

20μm

20μm

20μm

POROUS ELECTRODE SUBSTRATE AND PROCESS FOR PRODUCTION THEREOF, POROUS ELECTRODE SUBSTRATE PRECURSOR SHEET, MEMBRANE-ELECTRODE ASSEMBLY, AND POLYMER ELECTROLYTE FUEL CELL

TECHNICAL FIELD

The present invention relates to a process of producing a porous electrode substrate used in polymer electrolyte fuel cells.

BACKGROUND ART

Polymer electrolyte fuel cells are characterized in using a proton conductive polymer electrolyte membrane, and are devices that obtain electromotive force by allowing oxidizing gas such as oxygen to electrochemically react with fuel gas such as hydrogen. Such polymer electrolyte fuel cells have a structure in which two gas diffusion electrodes, including a catalyst layer with carbon powder on which a noble metal-based catalyst is supported as a main component and a gas diffusion electrode base material, respectively have a catalyst layer side thereof set to the inside, and are bonded to both sides of a polymer electrolyte membrane.

The gas diffusion electrode substrate is generally configured from a carbonaceous material, and the gas diffusion electrode substrates indicated below are known, for example.

Patent Document 1 discloses a porous carbon electrode substrate for fuel cells characterized by having a thickness of 0.05 to 0.5 mm, a bulk density of 0.3 to 0.8 g/cm$^3$, and a bending strength of at least 10 MPa and deflection upon bending of at least 1.5 mm in a three-point bending test under the conditions of a strain rate of 10 mm/min, a distance between support points of 2 cm and a test piece width of 1 cm.

Patent Document 2 discloses a gas diffusion layer for fuel cells including a mat having a plurality of carbon fibers, and a plurality of acrylic pulp fibers incorporated into this carbon fiber mat, and that the acrylic pulp fibers are cured and carbonized after incorporation into the carbon fiber mat.

Patent Document 3 discloses a carbon fiber sheet having a thickness of 0.15 to 1.0 mm, a bulk density of 0.15 to 0.45 g/cm$^3$, a carbon fiber content of at least 95% by mass, a compressive deformation rate of 10 to 35%, an electrical resistance value of no more than 6 mΩ, and a degree of drape of 5 to 70 g.

Patent Document 4 discloses a carbon fiber non-woven fabric for a polyelectrolyte fuel cell electrode material having a thickness of 0.15 to 0.60 mm, a basis weight of 50 to 150 g/m$^2$, a specific resistance value in the thickness direction of no more than 0.20 Ωcm, and a surface pile number of no more than 15/mm$^2$.

Patent Document 1: Pamphlet of PCT International Publication No. WO2001/056103

Patent Document 2: Japanese Unexamined Patent Application, Publication No. 2007-273466

Patent Document 3: Pamphlet of PCT International Publication No. WO2002/042534

Patent Document 4: Japanese Unexamined Patent Application, Publication No. 2003-45443

DISCLOSURE OF THE INVENTION

Problems to be Solved by the Invention

However, although the porous carbon electrode material disclosed in Patent Document 1 has high mechanical strength and surface smoothness, and has adequate gas permeability and electrical conductivity, the production cost thereof is high. Although the gas diffusion layer for fuel cells disclosed in Patent Document 2 can be produced at low cost, there is little entangling of the acrylic pulp with carbon fibers upon making into a sheet, and thus the handling thereof has been difficult. In addition, since acrylic pulp has low molecular orientation of polymer compared with fibrous materials, the carbonization rate during carbonization is low, and thus it has been necessary to add an abundance of acrylic pulp in order to raise the handling property. The carbon fiber sheet and carbon fiber non-woven fabric disclosed in Patent Documents 3 and 4 can be produced at low cost; however, the shrinkage thereof during calcining is large, and thus the undulation (heaving state or warped state of sheet cross section) of the obtained sheet, etc. has been large. Furthermore, since the handling property is improved by fiber entangling, the sheet surface has become fluffy from the carbon fibers, whereby the polymer electrolyte membrane has been damaged upon incorporating the sheet in the fuel cell.

The present invention has an object of providing a porous electrode substrate excelling in handling property, having improved sheet undulation, as well as retaining sufficient gas permeability and electrical conductivity, and further, does not inflict damage on the polymer electrolyte membrane upon incorporating in the fuel cell, as well as a process of producing the same.

In addition, the present invention has an object of providing a porous electrode substrate precursor sheet that can be suitably used in order to obtain the above-mentioned porous electrode substrate, as well as a membrane-electrode assembly and polymer electrolyte fuel cell using the above-mentioned porous electrode substrate.

Means for Solving the Problems

The following first to twelfth aspects of the invention are provided by the present invention.

According to a first aspect of the invention, a porous electrode substrate includes, layer stacked and integrated therein: a three-dimensional structure Y-1 produced by bonding short carbon fibers (A1) by carbon (D); and a three-dimensional structure Y-2 produced by bonding short carbon fibers (A2) by carbon (D), in which the short carbon fibers (A1) form a three-dimensional entangled structure in the three-dimensional structure Y-1, and the short carbon fibers (A2) do not form a three-dimensional entangled structure in the three-dimensional structure Y-2.

According to a second aspect of the invention, in the porous electrode substrate as described in the first aspect, the three-dimensional structure Y-1 is a three-dimensional structure in which the short carbon fibers (A1) are bonded by three-dimensional mesh-like carbon fibers (B), and the three-dimensional structure Y-2 is a three-dimensional structure in which the short carbon fibers (A2) are bonded by two-dimensional mesh-like carbon fibers (C).

According to a third aspect of the invention, a porous electrode substrate precursor sheet includes, layer stacked and integrated therein: a precursor sheet X-2' having dispersed therein short carbon fibers (A1), and short carbon fiber precursors (b1) and/or fibrillar carbon fiber precursors (b1'); and a precursor sheet X-3' having dispersed therein short carbon fibers (A2), and short carbon fiber precursors (b2) and/or fibrillar carbon fiber precursors (b2'), in which the short carbon fibers (A1) form a three-dimensional entangled structure in the precursor sheet X-2', and the short carbon fibers (A2) do not form a three-dimensional entangled structure in the precursor sheet X-3'.

According to a fourth aspect of the invention, in the porous electrode substrate as described in the third aspect, amass ratio of a mass of the short carbon fibers (A1) to a total mass of the short carbon fiber precursors (b1) and the fibrillar carbon fiber precursors (b1') is 20:80 to 80:20, and a mass ratio of a mass of the short carbon fibers (A2) to a total mass of the short carbon fiber precursors (b2) and the fibrillar carbon fiber precursors (b2') is 20:80 to 80:20.

According to a fifth aspect of the invention, a process of producing a porous electrode substrate includes: a step (1) of dispersing short carbon fibers (A1), and producing a precursor sheet X-1 of the short carbon fibers (A1) not having a three-dimensional entangled structure;
a step (2) of obtaining a precursor sheet X-2 having a three-dimensional entangled structure of the short carbon fibers (A1), by entanglement treating the precursor sheet X-1;
a step (3) of obtaining a porous electrode substrate precursor sheet X-4 by dispersing short carbon fibers (A2), and layer stacking and integrating a precursor sheet X-3 not having a three-dimensional entangled structure of the short carbon fibers (A-2), on the precursor sheet X-2; and
a step (4) of carbonization treating the porous electrode substrate precursor sheet X-4 at a temperature of at least 1000° C.

According to a sixth aspect of the invention, in the process of producing a porous electrode substrate as described in the fifth aspect, the precursor sheet X-2 having a three-dimensional entangled structure of the short carbon fibers (A1) and the precursor sheet X-3 not having a three-dimensional entangled structure of the short carbon fibers (A2) are layer stacked and integrated in step (3), by feeding a slurry in which the short carbon fibers (A2) are dispersed in a liquid medium onto the precursor sheet X-2 and making into a sheet.

According to a seventh aspect of the invention, in the process of producing a porous electrode substrate as described in the fifth or sixth aspect, the short carbon fiber precursors (b1) and/or fibrillar carbon fiber precursors (b1') are dispersed together with the short carbon fibers (A1) in step (1), and the short carbon fiber precursors (b2) and/or fibrillar carbon fiber precursors (b2') are dispersed together with the short carbon fibers (A2) in step (3).

According to an eighth aspect of the invention, the process of producing a porous electrode substrate as described in any one of the fifth to seventh aspects further includes a step (5) of hot press molding the porous electrode substrate precursor sheet X-4 at a temperature of less than 200° C., after step (3) but before step (4).

According to a ninth aspect of the invention, the process of producing a porous electrode substrate as described in the eighth aspect further includes a step (6) of oxidation treating, at a temperature of at least 200° C. and less than 300° C., the porous electrode substrate precursor sheet X-4 subjected to hot press molding, after step (5) but before step (4).

According to a tenth aspect of the invention, a porous electrode substrate is obtained by the process as described in any one of the fifth to ninth aspects.

According to an eleventh aspect of the invention, a membrane-electrode assembly includes the porous electrode substrate as described in the first, second or tenth aspect.

According to a twelfth aspect of the invention, a polymer electrolyte fuel cell includes the membrane-electrode assembly as described in the eleventh aspect.

Effects of the Invention

The present invention provides a porous electrode substrate excelling in handling property, having improved sheet undulation, as well as retaining sufficient gas permeability and electrical conductivity, and further, does not inflict damage on the polymer electrolyte membrane upon inserting in the fuel cell, as well as a process of producing the same.

In addition, the present invention provides a porous electrode substrate precursor sheet that can be suitably used in order to obtain the above-mentioned porous electrode substrate, as well as a membrane-electrode assembly and polymer electrolyte fuel cell using the above-mentioned porous electrode substrate.

EXPLANATION OF REFERENCE NUMERALS

Figure 1:
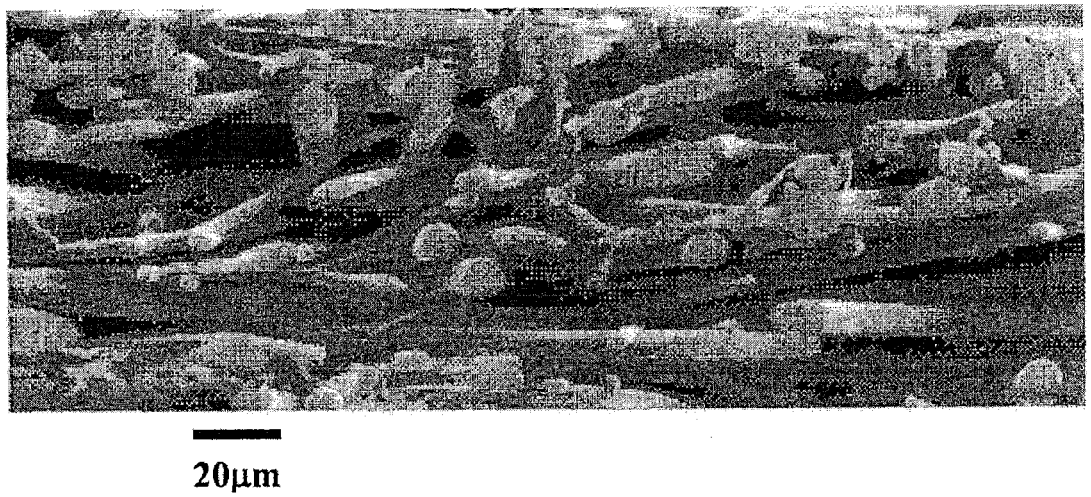
FIG. 1 is a scanning electron micrograph of a cross section of a three-dimensional structure of a porous electrode substrate obtained in Example 1 having a three-dimensional entangled structure.

1: line parallel to sheet surface
2: carbon fiber constituting three-dimensional mesh-like carbon fiber (B)
3: carbon fiber constituting two-dimensional mesh-like carbon fiber (C)
A1: short carbon fibers
A2: short carbon fibers

PREFERRED MODE FOR CARRYING OUT THE INVENTION

Porous Electrode Substrate

A porous electrode substrate of the present invention is composed of a structure layer stacking and integrating a three-dimensional structure Y-1 made by bonding short carbon fibers (A1) by carbon (D) and a three-dimensional structure Y-2 made by bonding short carbon fibers (A2) by carbon (D). The short carbon fibers (A1) form a three-dimensional entangled structure in the three-dimensional structure Y-1. The short carbon fibers (A2) do not form a three-dimensional entangled structure in the three-dimensional structure Y-2. It should be noted that the short carbon fibers (A1) and short carbon fibers (A2) (hereinafter may be collectively called "short carbon fibers (A)") may be the same or may be different.

The three-dimensional structure Y-1 is a three-dimensional structure made by bonding the short carbon fibers (A1) by carbon (D), and is a structure in which the short carbon fibers (A1) constituting the structure Y-1 are three-dimensionally entangled in the structure Y-1.

In addition, the three-dimensional structure Y-2 is a three-dimensional structure made by bonding the short carbon fibers (A2) by carbon (D), and is a structure in which the short carbon fibers (A2) constituting the structure Y-2 are not three-dimensionally entangled in the structure Y-2.

The three-dimensional structure Y-1 may be a three-dimensional structure in which the short carbon fibers (A1) are bonded by the three-dimensional mesh-like carbon fibers (B), and the three-dimensional structure Y-2 may be a three-dimensional structure in which the short carbon fibers (A2) are bonded by two-dimensional mesh-like carbon fibers (C).

The porous electrode substrate in which the three-dimensional structure Y-1 and the three-dimensional structure Y-2 are layer stacked and integrated can be in forms such as a sheet form and a spiral form. In a case of making in sheet form, the basis weight of the porous electrode substrate is preferably on the order of 15 to 100 g/m$^2$, the porosity is preferably on the order of 50 to 90%, the thickness is preferably on the order of 50 to 300 μm, and the undulation is preferably no more than 5 mm. The gas permeability of the porous electrode substrate is preferably 50 to 3000 ml/hr/cm$^2$/Pa. In addition, the electrical resistance (through-plane electrical resistance) in the thickness direction of the porous electrode substrate is preferably no higher that 50 mΩ·cm$^2$. It should be noted that the method of measuring the gas permeability and through-plane electrical resistance of the porous electrode substrate will be described later.

The total content of the three-dimensional mesh-like carbon fiber (B) to two-dimensional mesh-like carbon fiber (C) in the porous electrode substrate is preferably 5 to 90% by mass, and more preferably 10 to 60% by mass, from the viewpoint of the mechanical strength of the porous electrode substrate. In other words, the content of short carbon fiber (A) in the porous electrode substrate is preferably 10 to 95% by mass, and more preferably 40 to 90% by mass.

Presence or Absence of Three-Dimensional Entangled Structure

In the present invention, whether or not the short carbon fibers (A) form a three-dimensional entangled structure can be determined by performing cross-sectional observation of the sheet-like measurement target (three-dimensional structure Y-1, three-dimensional structure Y-2, porous electrode substrate, precursor sheet X-2', precursor sheet X-3', porous electrode substrate precursor sheet, precursor sheet X-1, precursor sheet X-2, precursor sheet X-3), and measuring the angles between the respective short carbon fibers and the sheet surface in the cross section. It should be noted that the cross section in which cross-sectional observation is made is a cross section in a vertical direction relative to the sheet surface of a sheet-like measurement target.

Figure 5:
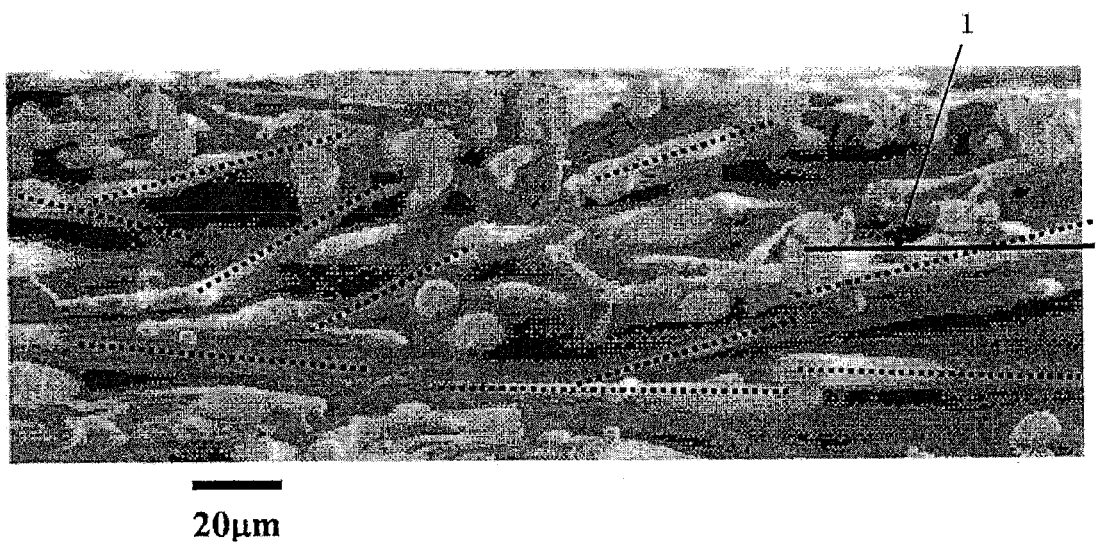
FIG. 5 is an image arrived at by drawing a dotted line on carbon fibers to be measured in the scanning electron micrograph shown in FIG. 1, in order to measure the angle between a short carbon fiber and a horizontal surface.
Figure 6:
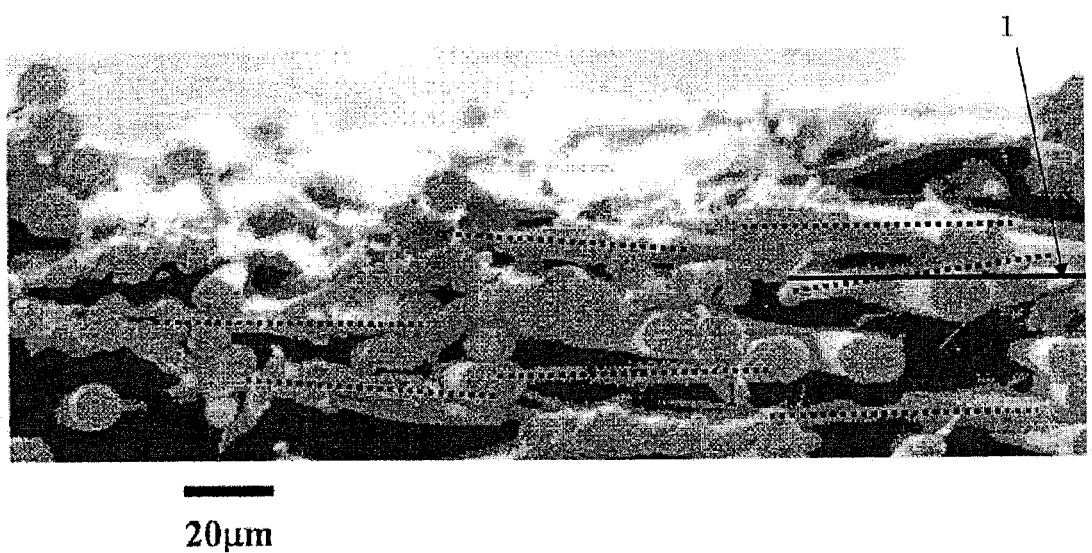
FIG. 6 is an image arrived at by drawing a dotted line drawn on carbon fibers to be measured in the scanning electron micrograph shown in FIG. 2, in order to measure the angle between a short carbon fiber and a horizontal surface.

In a case of the average of the angles of the short carbon fibers with the horizontal plane (sheet surface) measured being at least 3°, or the maximum value of the angle between the short carbon fibers and the horizontal plane being at least 10°, it is determined that the short carbon fibers are forming a three-dimensional entangled structure (the measurement target has a three-dimensional entangled structure), and in a case of not being as such, it is determined that the short carbon fibers are not forming a three-dimensional entangled structure (the measurement target does not have a three-dimensional entangled structure). More specifically, using an SEM image of a cross section in the vertical direction relative to the sheet surface and drawing lines as indicated by the dotted lines on the short carbon fibers to be measured as in FIGS. 5 and 6, it is sufficient to measure the angle between this line and the sheet surface (The lines 1 in FIGS. 5 and 6 are lines parallel to the sheet surface.). It should be noted that the number of measurement points upon deciding the average value and maximum value of angles can be set to 50 points, for example.

Three-dimensional Structure in which Short Carbon Fibers (A1) are Bonded by Three-Dimensional Mesh-Like Carbon Fibers (B)

Figure 7:
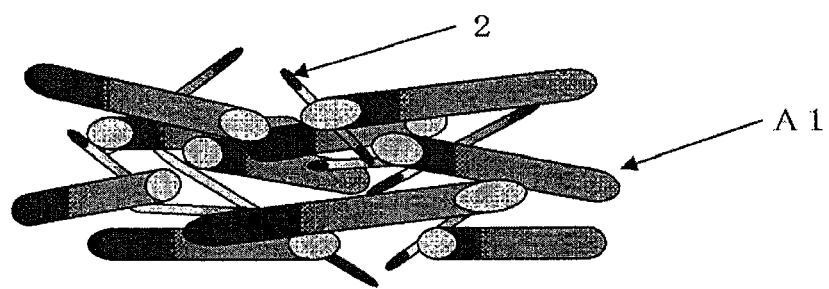
FIG. 7 is a schematic diagram of a three-dimensional structure in which short carbon fibers (A1) are bonded by three-dimensional mesh-like carbon fibers (B)

A schematic diagram of a three-dimensional structure in which the short carbon fibers (A1) are bonded by the three-dimensional mesh-like carbon fibers (B) is shown in FIG. 7. In this three-dimensional structure, the short carbon fibers (A1) are bonded by each of the carbon fibers 2 constituting the three-dimensional mesh-like carbon fibers (B).

Three-dimensional Structure in which Short Carbon Fibers (A2) are Bonded by Two-Dimensional Mesh-Like Carbon Fibers (C)

Figure 8:
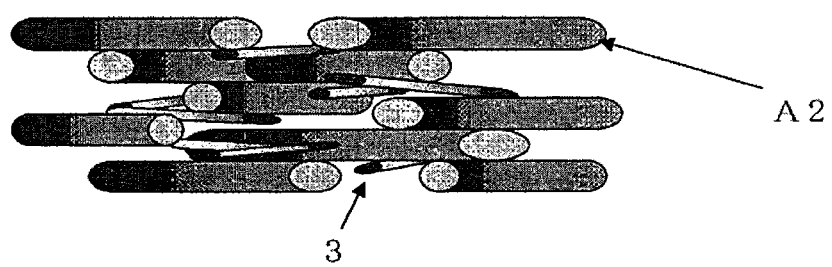
FIG. 8 is a perspective view of a three-dimensional structure not having a three-dimensional entangled structure, in which short carbon fibers (A2) are connected by two-dimensional mesh-like carbon fibers (C).

A schematic diagram of a three-dimensional structure in which the short carbon fibers (A2) are bonded by the two-dimensional mesh-like carbon fibers (C) is shown in FIG. 8. In this three-dimensional structure, the short carbon fibers (A2) are bonded by the respective carbon fibers 3 constituting the two-dimensional mesh-like carbon fibers (C).

Determination of Mesh-Like Carbon Fibers Bonding Short Carbon Fibers being Two-Dimensional or Three-Dimensional The determination of the mesh-like carbon fibers bonding the short carbon fibers being two-dimensional or three-dimensional can be conducted by carrying out cross section observation of a sheet-like measurement target (three-dimensional structure Y-1, three-dimensional structure Y-2), and measuring the angle in the cross section between the respective carbon fibers constituting the mesh-like carbon fibers bonding the short carbon fibers (carbon fibers 2 illustrated in FIG. 7, carbon fibers 3 illustrated in FIG. 8), and the sheet surface. It should be noted that the cross section in which cross section observation is performed is a cross section in a vertical direction relative to the sheet surface of the sheet-like measurement target. (Hereinafter, "carbon fibers constituting the mesh-like carbon fibers bonding short carbon fibers" will be referred to as "mesh-like constituent carbon fibers".)

A case in which the average of the angle of the mesh-like constituent carbon fibers with a horizontal plane measured being at least 3° is determined as three-dimensional, while a case of the average of the angle of the mesh-like constituent carbon fibers with a horizontal plane measured being less than 2° is determined as two-dimensional. More specifically, using an SEM image of a cross section in the vertical direction relative to the sheet surface and drawing dotted lines similarly to the dotted lines in FIGS. 5 and 6 on the mesh-like constituent carbon fibers being measured, it is sufficient to measure the angles between these lines and the sheet surface, similar to the measurement for the presence of a three-dimensional entangled structure. It should be noted that the number of measurement points upon deciding the average value of the angle can be set to 50 points, for example.

Short Carbon Fiber (A)

As the short carbon fiber (A), one produced by cutting a carbon fiber such as polyacrylonitrile-based carbon fiber (hereinafter referred to as "PAN-based carbon fiber"), pitch-based carbon fiber and rayon-based carbon fiber to an appropriate length can be exemplified. From the viewpoint of the mechanical strength of the porous electrode substrate, PAN carbon fiber is preferable. The average fiber length of the short carbon fibers (A) is preferably on the order of 2 to 12 mm in terms of dispersivity. The average fiber diameter of the short carbon fibers (A) is preferably 3 to 9 µm in terms of the dispersivity of the short carbon fibers, and is more preferably 4 to 8 µm in terms of the smoothness of the porous electrode substrate.

Carbon (D)

The carbon (D) is used in order to bind between the short carbon fibers (A), and a carbide can be used as the carbon (D). As the carbide, a carbonaceous material obtained by carbonizing a highly polymerized compound by heating can be used. The form of the carbon (D) is not particularly limited. Between the short carbon fibers (A) described later may be bound by carbon having a mesh-like form, between the short carbon fibers (A) may be bound by a carbonized resin, and it is also possible to use a combination of these. In addition, in a case of the carbon (D) being a carbonized resin, it is possible to use a heat carbonizable resin (f) as the source material thereof.

This heat carbonizable resin (f) can be selected as appropriate from known resins that can bind the between short carbon fibers (A) in the carbonizing stage. From the viewpoint of facilitating remaining as a conductive material after carbonization, a phenolic resin, epoxy resin, furan resin, pitch or the like is preferred as the resin (f), and a phenolic resin having a high carbonization rate upon carbonizing by heating is particularly preferable. As the phenolic resin, a resol-type phenolic resin obtained by the reaction between phenols and aldehydes under the presence of an alkali catalyst can be used. In addition, although a phenolic resin of Novolak type exhibiting solid-state heat fusability, produced by reaction between phenols and aldehydes under the presence of an acid catalyst by a known method, can be dissolved and mixed into a liquid phenolic resin of resol type, in this case, one of self crosslinking type containing a curing agent, e.g., hexamethylene diamine, is preferable. A phenolic resin solution produced by dissolving in alcohol or a solution of ketones, a phenolic resin dispersion produced by dispersing in a dispersant such as water, or the like can be used as the phenolic resin.

Three-dimensional Mesh-like Carbon Fiber (B)

The three-dimensional mesh-like carbon fibers (B) are fibers bonding the short carbon fibers (A), and can form a three-dimensional mesh-like structure by existing in a state forming a bent shape or a curved shape at the bonding part.

Two-dimensional Mesh-like Carbon Fiber (C)

The two-dimensional mesh-like carbon fibers (C) are fibers bonding the short carbon fibers (A), exist in a state forming a bent shape or curved shape at the bonding part, and can form a mesh-like structure formed within a two-dimensional plane.

Process of Producing Porous Electrode Substrate

The porous electrode substrate of the present invention can be produced by the following such processes, for example.

The first production process is a method of sequentially performing:

a step (1) of producing a precursor sheet X-1 not having a three-dimensional entangled structure, in which the short carbon fibers (A1) are dispersed;

a step (2) of obtaining a precursor sheet X-2 having a three-dimensional entangled structure by entanglement treating the precursor sheet X-1;

a step (3) of obtaining a porous electrode substrate precursor sheet X-4 by layer stacking and integrating, on the precursor sheet X-2, a precursor sheet X-3 not having a three-dimensional entangled structure in which the short carbon fibers (A-2) are dispersed; and a step (4) of carbonization treating the porous electrode substrate precursor sheet X-4 at a temperature of at least 1000° C.

According to this production process, it is possible to obtain a porous electrode substrate in which the three-dimensional structure Y-1 having a three-dimensional entangled structure in which the short carbon fibers (A1) are bonded by the carbon (D), and the three-dimensional structure Y-2 not having a three-dimensional entangled structure in which the short carbon fibers (A2) are bonded by the carbon (D), are layer stacked and integrated.

In this production process, it is preferable to disperse the short carbon fiber precursors (b1) and/or fibrillar carbon fiber precursors (b1') together with the short carbon fibers (A1) in step (1), and to disperse short carbon fiber precursors (b2) and/or fibrillar carbon fiber precursors (b2') together with the short carbon fibers (A2) in step (3). It should be noted that, instead of the above, it may be impregnated with the heat carbonizable resin (f) prior to step (4), or in addition to the above, it may be impregnated with the heat carbonizable resin (f) prior to step (4). These fibers (b1), (b1'), (b2) and (b2') as well as the resin (f) can function as the carbon (D) in the porous electrode substrate, after passing through carbonization treatment.

A second production process is a method of further performing a step (5) of hot press molding the porous electrode substrate precursor sheet X-4 at a temperature less than 200° C. after step (3), but before step (4) in the above first production process.

A third production process is a method of further performing a step (6) of oxidization treating the hot press molded porous electrode substrate precursor sheet X-4 at a temperature of at least 200° C. and less than 300° C. after step (5) but before step (4) in the above second production process.

It should be noted that, in the above-mentioned production processes, it is preferable to disperse the short carbon fiber precursors (b1) and/or fibrillar carbon fiber precursors (b1') together with the short carbon fibers (A1) in step (1), and to disperse the short carbon fiber precursors (b2) and/or fibrillar carbon fiber precursors (b2') together with the short carbon fibers (A2) in step (3). In this way, it is possible to obtain a precursor sheet X-2' having a three-dimensional entangled structure in which the short carbon fibers (A1) as well as the short carbon fiber precursors (b1) and/or fibrillar carbon fiber precursors (b1') are dispersed in step (1), and it is possible to obtain a precursor sheet X-3' not having a three-dimensional entangled structure in which the short carbon fibers (A2) as well as the short carbon fiber precursors (b2) and/or fibrillar carbon fiber precursors (b2') are dispersed in step (3). It should be noted that the precursor sheet X-2' has a three-dimensional entangled structure due to being entanglement treated in step (2).

It should be noted that the short carbon fiber precursors (p') and short carbon fiber precursors (b2) (hereinafter collectively called "short carbon fiber precursors (b)") may be the same or may be different. In addition, the fibrillar carbon fiber precursors (b1') and the fibrillar carbon fiber precursors (b2') (hereinafter collectively called "fibrillar carbon fiber precursors (b')") may be the same or may be different.

Resin Impregnation

In a case of the carbon (D) being a carbonized resin, it is possible to establish the porous electrode substrate by impregnating the heat carbonizable resin (f) into the porous electrode substrate precursor sheet X-4, subsequently curing by heating and pressurizing, and then carbonizing.

As the method of impregnating the carbonizable resin (f) into the precursor sheet, a method using a throttling device or a method overlapping a resin film on the precursor sheet is preferable. The method using a throttling device is a method configured so as to impregnate the precursor sheet with a resin solution, and then have the beam limiting device uniformly coat the entire carbon sheet with the uptake liquid, and adjusting liquid amount by changing the roll gap of the throttling device. In a case of the relative viscosity being low, it is possible to use a spray method or the like.

The method using a resin film first temporarily coats the carbonizable resin (f) onto mold release paper to make a film of the carbonizable resin (f). It is a method that subsequently performs a hot pressing process to laminate the film onto the precursor sheet and transcribes the carbonizable resin (f).

Short Carbon Fiber Precursors (b)

The short carbon fiber precursors (b) can be obtained by cutting long fibers of the carbon fiber precursor to an appropriate length. The fiber length of the short carbon fiber precursors (b) is preferably on the order of 2 to 20 mm in terms of dispersibility. Although the cross-sectional shape of the short carbon fiber precursors (b) is not particularly limited, a shape having high circularity is preferable in terms of the mechanical strength after carbonizing, and the production cost. In addition, the diameter of the short carbon fiber precursors (b) is preferably no more than 5 μm in order to suppress fracture from shrinking during carbonization.

A polymer can be used as the material of the short carbon fiber precursors (b), and it is preferable to use a polymer having a residual mass of at least 20% by mass in the step of carbonization treatment. Acrylic polymers, cellulose-based polymers, and phenolic polymers can be exemplified as such a polymer. When taking account of the aspects of spinnability, the ability to bond short carbon fibers (A) from low temperature to high temperature, and the residual mass during carbonization being high, and further, the fiber elasticity and fiber strength upon performing entanglement treatment described later, it is preferable to use an acrylic polymer containing at least 50% by mass acrylonitrile units.

The short carbon fiber precursors (b) may use one type independently, or may jointly use a plurality of types having different fiber diameters and polymers. Depending on the types of these short carbon fiber precursors (b) and fibrillar carbon fiber precursors (b'), the mixing ratio with the short carbon fibers (A) and the presence of oxidation treatment (step (6)) under at least 200° C. and no higher than 300° C., the proportion remaining as the three-dimensional mesh-like carbon fibers (B) or two-dimensional mesh-like carbon fibers (C) in the porous electrode substrate finally obtained will differ.

Fibrillar Carbon Fiber Precursors (b')

As the fibrillar carbon fiber precursors (b'), for example, fibers produced by beating treating a carbon precursor fiber (b'-1) having a structure in which a plurality of fibrils having a diameter of tens of micrometers (e.g., 0.1 to 3 μm) branches from a fibrous stem with a diameter on the order of 0.1 to 10 μm (hereinafter may be simply referred to as "fibers (b'-1)"), and short carbon fiber precursors (b'-2) made into fibrils by beating (hereinafter may be simply referred to as "fibers (b'-2)") can be exemplified.

By using this fibrillar carbon fiber precursor (b'), the short carbon fibers (A) and fibrillar carbon fiber precursors (b') are well intertwined inside the precursor sheet, whereby obtaining a precursor sheet excelling in handling property and mechanical strength is facilitated. Although the freeness of the fibrillar carbon fiber precursors (b') is not particularly limited, generally, the mechanical strength of the precursor sheet improves when using fibrillar fibers having low freeness; however, there is a tendency for the gas permeability of the porous electrode substrate to decline.

As the fibrillar carbon fiber precursors (b'), one type of fiber (b'-1) or one type produced by beating treatment of the fiber (b'-2) may be used, and a plurality of types of these fibers having different freeness, fiber diameter, polymer type, etc. may be jointly used. In other words, two or more types of fibers (b'-1) can be jointly used, two or more types of fibers produced by beating treating fibers (b'-2) can be jointly used, or alternatively, it is possible to jointly use at least one type of fiber (b'-1) and at least one type of fiber produced by beating treating the fiber (b'-2).

The polymer used in the fiber (b'-1) preferably has a residual mass in the carbonization treatment step of at least 20% by mass. Acrylic polymers, cellulose polymers and phenolic polymers can be exemplified as such a polymer. When taking account of the aspects of spinnability, the ability to bond short carbon fibers (A) from low temperature to high temperature, and the residual mass during carbonization being high, and further, the entangling with short carbon fibers (A) and sheet strength, it is preferable to use an acrylic polymer containing at least 50% by mass acrylonitrile units. Although the method of producing the fiber (b'-1) is not particularly limited, it is preferable to produce using a spray coagulation method for which the control of freeness is easy.

It is preferable for the average fiber length of the fibers (b'-1) to be 1 to 20 mm.

Fibers produced by cutting an easy-to-split sea-island composite fiber in long fiber form to an appropriate length can be used as the fibers (b'-2). Such fibers can be beat with a refiner, pulper or the like to make into fibrils. The fiber (b'-2) can be produced using at least two different kinds of polymers that are immiscible dissolved in a common solvent, and in this case, at least one type of polymer preferably has a residual mass in the carbonization treatment step of at least 20% by mass. As one having a residual mass of at least 20% by mass in the carbonization treatment step among the polymers used in the easy-to-split sea-island composite fibers, acrylic polymers, cellulose-based polymers and phenolic polymers can be exemplified. From the viewpoint of spinnability and residual mass in the carbonization treatment step, thereamong, it is preferable to use an acrylic polymer containing at least 50% by mass acrylonitrile units.

As an acrylic polymer that can be used in the fiber (b) and fiber (b'), it may be a homopolymer of acrylonitrile or a copolymer of acrylonitrile and another monomer. As the monomer copolymerized with acrylonitrile, it is not particularly limited so long as being an unsaturated monomer constituting a general acrylic fiber; however, for example, acrylates typified by methyl acrylate, ethyl acrylate, isopropyl acrylate, n-butyl acrylate, 2-ethylhexyl acrylate, 2-hydroxyethyl acrylate, hydroxypropylacrylate, and the like; methacrylates typified by methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, diethylaminoethyl methacrylate, and the like; acrylic acid, methacrylic acid, maleic acid, itaconic acid, acrylamide, N-methylolacrylamide, diacetoneacrylamide, styrene, vinyltoluene, vinyl acetate, vinyl chloride, vinylidene chloride, vinylidene bromide, vinyl fluoride, vinylidene fluoride, and the like can be exemplified.

The weight-average molecular weight of the acrylic polymer is not particularly limited, and is preferably 50,000 to 1,000,000. There is a tendency for the yarn quality of the fiber to be good simultaneously with the spinnability improving, by the weight-average molecular weight of the acrylic polymer being at least 50,000. There is a tendency for the polymer concentration attributing to the optimum viscosity of the spinning dope to rise and the productivity to improve, by the weight-average molecular weight of the acrylic polymer being no more than 1,000,000.

Among polymers used in the easy-to-split sea-island composite fiber that is the fiber (b'-2), in the case of using the aforementioned acrylic polymer as the polymer having a residual mass in the carbonization treatment step of at least 20% by mass, it is desirable to dissolve another polymer in a common solvent with this acrylonitrile-based polymer, and the spinning dope in which both polymers are dissolved to exist stably. In other words, in a case of the extent of immiscibility of the two polymers in the spinning dope being large, the fibers may be of uneven quality, and fiber formation may not be possible due to thread breakage during spinning. Therefore, in the case of dissolving the other polymer in a common solvent with the acrylonitrile-based polymer, a polymer is desirable that has enough compatibility to be able to form a sea-island structure upon spinning, but is immiscible in the acrylonitrile-based polymer. In addition, in a case of wet spinning, if the other polymer dissolves in water in a solidification tank or in a washing tank, loss occurs leading to disadvantages in production; therefore, it is preferable for the other polymer to be insoluble in water.

As the other polymer satisfying these requirements, for example, polyvinyl chloride, polyvinylidene chloride, polyvinylidene fluoride, polyvinylpyrrolidone, cellulose acetate, acrylic resins, methacrylic resins, phenolic resins, etc. can be exemplified; however, cellulose acetate, acrylic resin and methacrylic resins are preferable in the aspect of the balance of the aforementioned requirements. The other polymer may be one type or may be two or more types.

The easy-to-split sea-island composite fiber used as the fiber (b'-2) can be produced by a common wet spinning method. First, the spinning dope is prepared by dissolving the acrylonitrile-based polymer and the other polymer in a solvent. Alternatively, the spinning dope may be made by mixing, in a static mixer or the like, the spinning dope obtained by dissolving the acrylonitrile-based polymer in solvent and the spinning dope obtained by dissolving the other polymer in solvent. As the solvent, dimethylamide, dimethylformamide, dimethylsulfoxide or the like can be used. The easy-to-split sea-island composite fiber can be obtained by supplying these spinning dopes to a spinning machine and spinning from nozzles, then conducting wet hot drawing, washing, drying and dry hot drawing.

The cross-sectional shape of the fiber (b'-2) is not particularly limited. From the viewpoint of dispersibility, the fineness of the fiber (b'-2) is preferably 1 to 10 dtex, in order to suppress breakage due to shrinking during carbonization. The average fiber length of the fiber (b'-2) is preferably 1 to 20 mm from the viewpoint of dispersibility after beating.

The fiber (b'-2) is beaten by peeling off a phase-separated interface with a mechanical external force, and at least a portion thereof splits to form fibrils. The beating method is not particularly limited; however, it is possible to form fibrils by a refiner or pulper, a beater, or spraying of a pressurized water stream (water-jet punching). Upon beating the fibers (b'-2) by peeling off of the phase-separated interface with a mechanical external force, the state of fibrillation changes depending on the beating method and beating duration. As a method of evaluating the extent of fibrillation, the freeness evaluation (ISO-5267-2 (Canadian Standard Freeness Method)) can be used. The freeness of the fibers (b'-2) is not particularly limited.

Precursor Sheet without Three-Dimensional Entangled Structure

The precursor sheet X-1 can be obtained by dispersing the short carbon fibers (A1) and the short carbon fiber precursors (b1) and/or fibrillar carbon fiber precursors (b1'), and does not have a three-dimensional entangled structure. The precursor sheet X-3 can be obtained by dispersing the short carbon fibers (A2) and the short carbon fiber precursors (b2) and/or fibrillar carbon fiber precursors (b2'), and does not have a three-dimensional entangled structure. The short carbon fibers (A) are dispersed within a two-dimensional plane. In other words, the short carbon fibers (A1) in the precursor sheet X-1 are dispersed within a two-dimensional plane, and the short carbon fibers (A2) in the precursor sheet X-3 are dispersed within a two-dimensional plane.

The mass ratio of the short carbon fibers (A1) to the short carbon fiber precursors (b1) and fibrillar carbon fiber precursors (b1') in the precursor sheet X-1 is preferably 20:80 to 80:20 from the viewpoint of ensuring porous electrode substrate handling property after the carbonization treatment. The mass ratio of the short carbon fibers (A2) to the short carbon fiber precursors (b2) and fibrillar carbon fiber precursors (b2') in the precursor sheet X-3 is preferably 20:80 to 80:20 from the viewpoint of ensuring porous electrode substrate handling properties after the carbonization treatment.

The precursor sheets X-1 and X-3 can be produced by a wet method or dry method. The wet method is a method of sheet forming a precursor sheet by dispersing the short carbon fibers (A) with the short carbon fiber precursors (b) and/or fibrillar carbon fiber precursors (b') in a liquid medium. The dry method is a method of obtaining a precursor sheet by dispersing the short carbon fibers (A) with the short carbon fiber precursors (b) and/or fibrillar carbon fiber precursors (b') in air and allowing to fall. In order to assist in the short carbon fibers (A) opening into monofilaments, and prevent the opened monofilament from bundling again, and further, in order for the short carbon fibers (A) and short carbon fiber precursors (b) to intertwine to improve the sheet strength and make substantially binder free, it is preferable to produce the precursor sheet by the wet method using the fibrillar carbon fiber precursors (b').

As the medium dispersing the short carbon fibers (A) with the short carbon fiber precursors (b) and/or fibrillar carbon fiber precursors (b'), a medium in which the fiber short carbon fiber precursors (b) and/or fibrillar carbon fiber precursors (b') do not dissolve such as water and alcohol can be exemplified, for example; however, water is preferable from the viewpoint of productivity.

The precursor sheets X-1 and X-3 can be produced by either a continuous method or batch method; however, it is preferable to produce by a continuous method from the viewpoint of the productivity and mechanical strength of the precursor sheets X-1 and X-3.

Entanglement Treatment

The precursor sheet X-2 is obtained by subjecting the precursor sheet X-1 to entanglement treatment. The entanglement treatment to entanglement the short carbon fibers (A) with the short carbon fiber precursors (b) and/or fibrillar carbon fiber precursors (b') in the precursor sheet X-1 can be implemented by a known method so long as being a method in which a three-dimensional entangled structure is formed. For example, a mechanical entangling method such as a needle punching method, a high-pressure liquid spray method such as a water-jet punching method, a high-pressure gas spraying method such as steam-jet punching, or a method by a combination of these can be used. A high-pressure liquid jet processing method is preferable from the aspects of being able to suppress breakage of the short carbon fibers (A) in the entangling step, and sufficient entangling being obtained.

High-pressure Liquid Jet Processing Method

The high-pressure liquid jet processing method is a processing method in which a precursor sheet is placed on a support member with a substantially smooth surface, and entangling the short carbon fibers (A) with the short carbon fiber precursors (b) and/or fibrillar carbon fiber precursors (b') in the precursor sheet by causing a columnar liquid jet, fan-shaped liquid jet, slit liquid jet or the like sprayed at a pressure of 1 MPa to act thereon, for example. Herein, for the support member with a substantially smooth surface, any support member can be used so long as the design of the support member is not formed in the obtained structure having a three-dimensional entangled structure, and the sprayed liquid is quickly removed therefrom. As a specific example thereof, a 30 to 200 mesh wire net or plastic net, a roll, or the like can be exemplified.

In the present invention, from the viewpoint of productivity, it is preferable to continuously produce the precursor sheet X-2 having a three-dimensional entangled structure by high-pressure liquid jet processing, after having continuously produced the precursor sheet X-1 on the support member with a substantially smooth surface.

As the liquid used in the high-pressure liquid jet processing, although any solvent that does not dissolve the fibers constituting the precursor sheet X-1 is acceptable, it is usually preferable to use water. There are no particular restrictions to the temperature of the water sprayed, and room temperature water may be used. The orifice size of the respective spray nozzles in the high-pressure liquid jet nozzle is preferably in the range of 0.06 to 1.0 mm, and more preferably in the range of 0.1 to 0.3 mm in the case of being a columnar stream. The distance between the nozzle jet orifice and the precursor sheet X-1 is preferable in the range of about 0.5 to 5 cm. The pressure of the liquid is preferably at least 1 MPa and no more than 7 MPa, and more preferably at least 1 MPa and no more than 5 MPa. The entanglement treatment may be performed in one line, or may be performed in a plurality of lines. In the case of performing in a plurality of lines, it is effective to increase the pressure of the high-pressure liquid jet processing of the second and later lines over the first line.

The entanglement treatment of the precursor sheet X-1 by a high-pressure liquid jet may be repeated a plurality of times. In other words, after having performed the high-pressure liquid jet processing of the precursor sheet X-1, another precursor sheet X-1 on the precursor sheet X-1 subjected to high-pressure spray processing is layer stacked, and then the high-pressure liquid jet processing may be performed. The precursor sheet X-1 may be turned over while the three-dimensional entangled structure is being formed by the high-pressure liquid jet, and the high-pressure liquid jet processing may be further performed from the opposite side. In addition, these operations may be repeated.

In a case of continuously producing the precursor sheet X-2, the formation of striped track patterns resulting from the high-pressure liquid jet processing of the sheet in the sheet-forming direction can be suppressed by causing the high-pressure liquid jet nozzles provided with one line or a plurality of lines of nozzle orifices to oscillate in the width direction of the sheet. By suppressing the striped track patterns in the sheet-forming direction, it is possible to realize mechanical strength in the sheet width direction. In addition, in a case of using a plurality of the high-pressure liquid jet nozzles provided with one line or a plurality of lines of nozzle orifices, it is possible to suppress periodic design appearing on the three-dimensional entangled structure precursor sheet by controlling the frequency at which the high-pressure liquid jet nozzles oscillate in the width direction of the sheet, as well as the phase difference thereof.

Lamination and Integration

The porous electrode substrate precursor sheet X-4 is produced by layer stacking and integrating the precursor sheet X-3 not having a three-dimensional entangled structure on the precursor sheet X-2 having a three-dimensional entangled structure. As the method of layer stacking and integrating, a method of separately producing the precursor sheet X-2 and the precursor sheet X-3, respectively, and then overlapping, a method of directly producing the precursor sheet X-3 on the precursor sheet X-2, and the like can be exemplified. Due to the bonding between the precursor sheet X-2 and the precursor sheet X-3 being easy, and further, the bonding force between sheets being strong, the method of directly producing the precursor sheet X-3 on the precursor sheet X-2 is preferable. For example, in the case of sheet forming by the wet method, the porous electrode substrate precursor sheet X-4 in which the precursor sheet X-2 having a three-dimensional entangled structure and the precursor sheet X-3 not having a three-dimensional entangled structure are layer stacked and integrated can be obtained by directly feeding, onto the precursor sheet X-2 produced in advance, a slurry in which the short carbon fibers (A2) as well as the short carbon fiber precursors (b2) and/or fibrillar carbon fiber precursors (b2') are dispersed in a liquid medium to form a sheet. The porous electrode substrate precursor sheet X-4 can also be obtained by layer stacking a plurality of the precursor sheets X-3 on the precursor sheet X-2.

The basis weight of the porous electrode substrate precursor sheet X-4 is preferably on the order of 10 to 200 g/m$^2$, and the thickness is preferably on the order of 20 to 400 μm. It should be noted that the basis weight of the precursor sheet X-3 not having a three-dimensional entangled structure is preferably no more than 70% that of the porous electrode substrate precursor sheet X-4 in the aspect of raising the handling property of the porous electrode substrate precursor sheet X-4 and the porous electrode substrate, and is preferably at least 20% that of the porous electrode substrate precursor sheet X-4 in the aspect of reducing the damage to the polyelectrolyte membrane upon incorporating into the fuel cell of the porous electrode substrate. In other words, the basis weight of the precursor sheet X-2 having a three-dimensional entangled structure is preferably 30 to 80% that of the porous electrode substrate precursor sheet X-4.

Carbonization Treatment

The porous membrane base material precursor sheet X-4 can be carbonization treated as is, can be carbonization treated after hot press molding, and can be carbonization treated after oxidation treatment following the hot press molding. The production cost can be curbed by carbonization treating as is. The mechanical strength and conductivity of the obtained porous electrode substrate can be raised by causing the short carbon fibers (A) to fuse by the short carbon fiber precursors (b) and/or fibrillar carbon fiber precursors (b'1), and establishing a three-dimensional mesh-like carbon fibers (B) or two-dimensional mesh-like carbon fibers (C) by carbonizing the short carbon fiber precursors (b) and/or fibrillar carbon fiber precursors (b').

The carbonization treatment is preferably performed in inert gas in order to raise the conductivity of the porous electrode substrate. The carbonization treatment is usually performed at a temperature of at least 1000° C. The temperature range of the carbonization treatment is preferably 1000 to 3000° C., and more preferably 1000 to 2200° C. The time of the carbonization treatment is on the order of 10 minutes to 1 hour, for example. In addition, a pretreatment can be performed prior to the carbonization treatment by calcining in an inert atmosphere on the order of 300 to 800° C.

In a case of carbonization treating the porous electrode substrate precursor sheet X-4 produced continuously, it is preferable to perform carbonization treatment continuously over the entire length of the porous electrode substrate precursor sheet X-4, from the viewpoint of a production cost reduction. If the porous electrode substrate is long, since the handling property will improve, the productivity of the porous electrode substrate will rise, and the subsequent production of a membrane electrode assembly (MEA) can also be performed continuously, it is possible to reduce the production cost of the fuel cell. From the viewpoints of the productivity of the porous electrode substrate and fuel cell and a production cost reduction, it is preferable to continuously roll up the produced porous electrode substrate.

Hot Press Molding

From the viewpoint of fusing the short carbon fibers (A) in the porous electrode substrate precursor sheet X-4 by the short carbon fiber precursors (b) and/or fibrillar carbon fiber precursors (b'), reducing the thickness irregularity of the porous electrode substrate, and further, suppressing fluffing of each fiber in the vicinity of a sheet edge surface due to the entanglement treatment, it is preferable to hot press mold the porous electrode substrate precursor sheet X-4 at a temperature less than 200° C. prior to the carbonization treatment. The hot press molding can adopt any technique so long as being a technique that can uniformly hot press mold the porous electrode substrate precursor sheet X-4. For example, a method of hot pressing by placing flat rigid plates against both sides of the porous electrode substrate precursor sheet X-4, and a method using a continuous roll press machine or a continuous belt press machine can be exemplified.

In the case of hot press molding the porous electrode substrate precursor sheet X-4 continuously produced, a method using a continuous roll press machine or a continuous belt press machine is preferable. Continuously performing carbonization treatment is thereby facilitated. As the pressing method of the continuous belt press machine, a method applying pressure by with linear pressure to the belt by way of a roll press, a method of pressing with specific pressure by way of a hydraulic head press, and the like can be exemplified. The latter is preferable in the aspect of a smoother porous electrode substrate being obtained.

In order to effectively smooth the surface of the porous electrode substrate precursor sheet X-4, the temperature during hot press molding is preferably less than 200° C., and more preferably 120 to 190° C.

Although the pressure during the hot press molding is not particularly limited, it is preferably on the order of 20 kPa to 10 MPa from the viewpoint of short carbon fiber (A) breakage prevention during hot press molding, and the viewpoint of porous electrode substrate densification prevention. In a case of the content ratio of the short carbon fiber precursors (b) and/or fibrillar carbon fiber precursors (b') in the porous electrode substrate precursor sheet X-4 being large, the surface of the precursor sheet Y can be easily smoothened even if the molding pressure is low.

The duration of the hot press molding can be set to 30 seconds to 10 minutes, for example. When hot press molding the porous electrode substrate precursor sheet X-4 by sandwiching between two rigid plates or with a continuous roll press machine or continuous belt press machine, it is preferable to spread mold release agent thereon beforehand, or to interpose mold release paper between the precursor sheet and the rigid plates, roll or belt, so that the short carbon fiber precursors (b) and/or fibrillar carbon fiber precursors (b'), etc. do not adhere to the rigid plates, roll or belt.

Oxidation Treatment

From the viewpoint of the fusion of the short carbon fibers (A) by the short carbon fiber precursors (b) and/or fibrillar carbon fiber precursors (b') being satisfactorily carried out, and improving the carbonization rate of the short carbon fiber precursors (b) and/or fibrillar carbon fiber precursors (b'), it is preferable to oxidation treat the porous electrode substrate precursor sheet X-4 obtained by hot press molding, at a temperature of at least 200° C. and less than 300° C. in the atmosphere. The oxidation treatment is more preferably performed at 240 to 270° C.

Continuous oxidation treatment by way of a pressurized direct heating using a heated porous plate, or continuous oxidation treatment by way of intermittent pressurized direct heating using a heated roller or the like is preferable in the aspect of being low cost and being able to fuse the short carbon fibers (A) with the short carbon fiber precursors (b) and/or fibrillar carbon fiber precursors (b').

The duration of the oxidation treatment can be set to 1 minute to 2 hours, for example. In the case of oxidation treating the porous electrode substrate precursor sheet X-4 produced continuously, it is preferable to perform oxidation treatment continuously over the entire length of the porous electrode substrate precursor sheet X-4. Continuously performing carbonization treatment is thereby facilitated, and it is possible to improve the productivity of the porous electrode substrate, membrane electrode assembly and fuel cell, and reduce production cost.

Membrane Electrode Assembly (MEA)

The porous electrode substrate of the present invention can be suitably used in a membrane electrode assembly. Membrane electrode assemblies are composed of a polymer electrolyte membrane, catalyst layer and porous carbon electrode base material, providing a cathode-side catalyst layer composed of an oxidizing gas catalyst on one side of the polymer electrolyte membrane having proton conductivity, and providing an anode-side catalyst layer composed of a fuel gas catalyst on the other side, and in which a cathode-side porous electrode substrate and anode-side porous electrode substrate are provided on the outer sides of the respective catalyst layers. In order to reduce the damage from the porous electrode substrate on the polymer electrolyte membrane, it is preferable to arrange a three-dimensional structure Y-2 side of the porous electrode substrate not having a three-dimensional entangled structure at a surface contacting the polymer electrolyte membrane.

Polymer Electrolyte Fuel Cell

The membrane-electrode assembly of the present invention can be suitably used in a polymer electrolyte fuel cell. The polymer electrolyte fuel cell includes a cathode-side separator on which cathode-side gas channels are formed, and an anode-side separator on which anode-side gas channels are formed, so as to sandwich the membrane electrode assembly. In addition, an oxidizing gas inlet and oxidizing gas outlet, and fuel gas inlet and fuel gas outlet are provided to the respective separators.

According to the present invention, it is possible to obtain a porous electrode substrate excelling in handling property, having improved sheet undulation, as well as retaining sufficient gas permeability and electrical conductivity, and further, does not inflict damage on the polymer electrolyte membrane upon incorporating in the fuel cell. In addition, according to the method of producing a porous electrode substrate of the present invention, it is possible to produce the porous electrode substrate at low cost.

EXAMPLES

Hereinafter, the present invention will be explained more specifically by way of the Examples. Each property value, etc. in the Examples was measured by the following methods. "Parts" indicates "parts by mass".

(1) Gas Permeability

Based on ISO-5636-5, the time required for 200 mL of air to permeate was measured using a Gurley Densometer, and the gas permeability (ml/hr/cm$^2$/Pa) of the porous electrode substrate was calculated.

(2) Thickness

The thickness of the porous electrode substrate was measured using a dial thickness gauge (trade name: 7321, manufacturing by Mitutoyo Corp.). The size of the gauge head was 10 mm in diameter, and the measurement pressure was set to 1.5 kPa.

(3) Through-Plane Resistance

The resistance value was measured when sandwiching the porous electrode substrate between gold plated copper plates, pressurizing from above and below the copper plates at 1 MPa, and flowing current at an current density of 10 mA/cm$^2$, and the electrical resistance (through-plane resistance) in the thickness direction of the porous electrode substrate was obtained from the following equation. Through-plane resistance (mΩ·cm$^2$)=measured resistance value (mΩ)×sample surface area (cm$^2$)

(4) Total Content of Three-Dimensional Mesh-Like Carbon Fiber (B) and Two-Dimensional Mesh-Like Carbon Fiber (C)

The total content of the three-dimensional mesh-like carbon fiber (B) and two-dimensional mesh-like carbon fiber (C) was calculated according to the following formula from the basis weight of the obtained porous electrode substrate and the basis weight of the short carbon fibers (A) used.

Total content (mass %) of three-dimensional mesh-like carbon fiber (B) and two-dimensional mesh-like carbon fiber (C)=[porous electrode substrate basis weight (g/m$^2$)−short carbon fiber (A) basis weight (g/m$^2$)]/porous electrode substrate basis weight (g/m$^2$)×100

(5) Undulation of Porous electrode substrate

The undulation of the porous electrode substrate was calculated from the difference between the maximum value and minimum value of the height when laying a porous electrode substrate with a height of 250 mm and width of 250 mm on a flat plate.

(6) Damage to Polymer Electrolyte Membrane when Incorporating to Fuel Cell

A perfluorosulfonic acid-based polymer electrolyte membrane (membrane thickness: 30 μm) on which catalyst layers (catalyst layer surface area: 25 cm$^2$, Pt deposit per unit area: 0.3 mg/cm$^2$) composed of catalyst loaded carbon (catalyst: Pt, catalyst loading: 50% by mass) were formed on both sides was sandwiched between two porous electrode substrates so that the three-dimensional structure side not having a three-dimensional entangled structure contacted with the polymer electrolyte membrane, and these were bonded to obtain an MEA. This MEA was interposed by the two carbon separators having bellows-like gas channels to prepare a polymer electrolyte fuel cell (unit cell). Then, by measuring the open circuit voltage (OCV) when supplying hydrogen gas and air through bubblers at 80° C. to the unit cell with the temperature set to 80° C., the damage to the polymer electrolyte membrane upon incorporating in the fuel cell was confirmed.

Example 1

PAN-based carbon fiber having an average fiber diameter of 7 μm and average fiber length of 3 mm was prepared as the short carbon fiber (A). In addition, as the short carbon fiber precursor (b), acrylic short fiber having an average fiber diameter of 4 μm and average fiber length of 3 mm was prepared (trade name: D122, manufactured by Mitsubishi Rayon Co., Ltd.), and as the fibrillar carbon fiber precursor (b'), easy-to-split acrylic sea-island composite fiber (b'-2) composed of diacetate (cellulose acetate) and acrylic polymer to be fibrillated by beating was prepared (trade name: VONNEL M.V.P-C651, average fiber length: 3 mm, manufactured by Mitsubishi Rayon Co., Ltd.)

By the following operations, the precursor sheet X-1, precursor sheet X-2 having a three-dimensional entangled structure, and the porous electrode substrate precursor sheet X-4 produced by layer stacking and integrating the precursor sheet X-3 not having a three-dimensional entangled structure onto the precursor sheet X-2 were continuously produced to obtain a carbon electrode base material.

(Defibration of Short Carbon Fibers (A))

The short carbon fibers (A) were dispersed in water so that the fiber concentration was 1% by mass (10 g/L), and were defibration treated through a disk refiner (manufactured by Kumagai Riki Kogyo Co., Ltd.) to provide defibrated slurry fibers (SA).

(Defibration of Short Carbon Fiber Precursors (b))

The short carbon fiber precursors (b) were dispersed in water so that the fiber concentration was 1% by mass (10 g/L), and were defibration treated through a disk refiner (manufactured by Kumagai Riki Kogyo Co., Ltd.) to provide defibrated slurry fibers (Sb).

(Defibration of Fibrillar Carbon Fiber Precursors (b'))

The easy-to-split acrylic sea-island composite short fibers were dispersed in water so that the fiber concentration was 1% by mass (10 g/L), and were subjected to beating and defibration treatment through a disk refiner (manufactured by Kumagai Riki Kogyo Co., Ltd.) to provide defibrated slurry fibers (Sb').

(Preparation of Sheet-Forming Slurry)

The defibrated slurry fibers (SA), defibrated slurry fibers (Sb), defibrated slurry fibers (Sb') and dilution water were measured so that the mass ratio of the short carbon fibers (A) to short carbon fiber precursors (b) to fibrillar carbon fiber precursors (b') was 50:30:20 and the concentration of fibers in the slurry was 1.44 g/L, and were charged into a slurry feed tank. Furthermore, polyacrylamide was added to prepare a sheet-forming slurry with a viscosity of 22 centipoise (22 mPa·s).

(Production of Precursor Sheet X-1)

Treatment equipment was used including a sheet-shaped material conveying device made from a net driving unit, and a continuously rotatable net in which a plain-woven mesh made of a 60 cm wide by 585 cm long plastic net was connected in a belt shape; a sheet-forming slurry feed apparatus having a slurry feed portion width of 48 cm and a feed slurry amount of 30 L/min; and a reduced-pressure dewatering apparatus arranged under the net.

Then, the aforementioned sheet-forming slurry was fed above the plain-woven mesh by a metering pump. The sheet-forming slurry was widened to a predetermined size through a flow box for rectifying to a uniform flow, and then fed. Subsequently, it was left to stand, passed through a natural dewatering portion, and then dewatered by the reduced-pressure dewatering apparatus, thereby obtaining the precursor sheet X-1. It should be noted that the target basis weight of the precursor sheet X-1 was set to 35 g/m².

(Production of Precursor Sheet X-2 Having Three-Dimensional Entangled Structure)

Downstream of the treatment equipment, the pressurized water stream jet treatment apparatus including three water jet nozzles shown in the below Table 1 was arranged.

TABLE 1

| | Orifice size | Pitch between orifices (width direction) | Arrangement | Nozzle effective width |
|---|---|---|---|---|
| Nozzle1 | φ 0.15 mm × 501 orifices | 1 mm (1001 orifices/ 1 m width) | 1 line arrangement | 500 mm |
| Nozzle2 | φ 0.15 mm × 501 orifices | 1 mm (1001 orifices/ 1 m width) | 1 line arrangement | 500 mm |
| Nozzle3 | φ 0.15 mm × 1002 orifices | 1.5 mm | 3 line arrangement Pitch between lines 5 mm | 500 mm |

The precursor sheet X-1 was loaded onto a net of the pressurized water stream jet treatment apparatus. Then, setting the pressurized water stream jet pressure to 1 MPa (nozzle 1), 2 MPa (nozzle 2) and 1 MPa (nozzle 3), the precursor sheet X-1 was subjected to entanglement treatment by being passed in the order of the nozzle 1, nozzle 2 and nozzle 3, thereby obtaining the precursor sheet X-2 having a three-dimensional entangled structure. It should be noted that the target basis weight of the precursor sheet X-2 having a three-dimensional entangled structure is 35 g/m², which is the same as the target basis weight of the precursor sheet X-1.

(Production of Porous Electrode Substrate Precursor Sheet X-4 in which Precursor Sheet X-3 without Three-Dimensional Entangled Structure is Layer Stacked and Integrated on Precursor Sheet X-2)

Further downstream of the pressurized water stream jet treatment apparatus, treatment equipment (treatment equipment including sheet-like material conveying apparatus, sheet-forming slurry feed apparatus, and reduced-pressure dewatering apparatus arranged under net) similar to the treatment equipment used in the production of the precursor sheet X-1 were arranged.

Then, the aforementioned sheet-forming slurry was fed by a metering pump from above the precursor sheet X-2 having a three-dimensional entangled structure loaded onto the plain-woven mesh. The sheet-forming slurry was widened to a predetermined size through a flow box for rectifying to a uniform flow, and then fed. Subsequently, it was left to stand, passed through a natural dewatering portion, and dewatered by the reduced-pressure dewatering apparatus, and the precursor sheet X-3 not having a three-dimensional entangled structure was layer stacked, thereby obtaining the porous electrode substrate precursor sheet X-4 in which the precursor sheet X-2 having a three-dimensional entangled structure and the precursor sheet X-3 not having a three-dimensional entangled structure are layer stacked and integrated. It should be noted that, since the target basis weight of the precursor sheet X-3 was set to 35 g/m², the target basis weight of the porous electrode substrate precursor sheet X-4 is 70 g/m².

(Dry Treatment)

The porous electrode substrate precursor sheet X-4 was dried for 3 minutes at 150° C. by a pin tenter tester (trade name: PT-2A-400, manufactured by Tsuji Dyeing Machine Manufacturing Co., Ltd.). The basis weight of the porous electrode substrate precursor sheet X-4 was 70.2 g/m². The dispersed state of the short carbon fibers (A), short carbon fiber precursors (b) and fibrillar carbon fiber precursors (b') in this porous electrode substrate precursor sheet X-4 was favorable, and further, e of fibers in the precursor sheet X-2 was favorable, and the handling property was also favorable.

(Hot Press Molding)

Next, both surfaces of the porous electrode substrate precursor sheet X-4 were interposed between paper coated with a silicone-based mold release agent, and then, was hot press molded for 3 minutes under conditions of 180° C. and 3 MPa in a batch press machine.

(Carbonization Treatment)

Subsequently, the porous electrode substrate precursor sheet X-4 was carbonization treated in a batch carbonization furnace in a nitrogen gas atmosphere under the condition of 2000° C. to obtain the porous electrode substrate.

(Evaluation Results)

Figure 2:
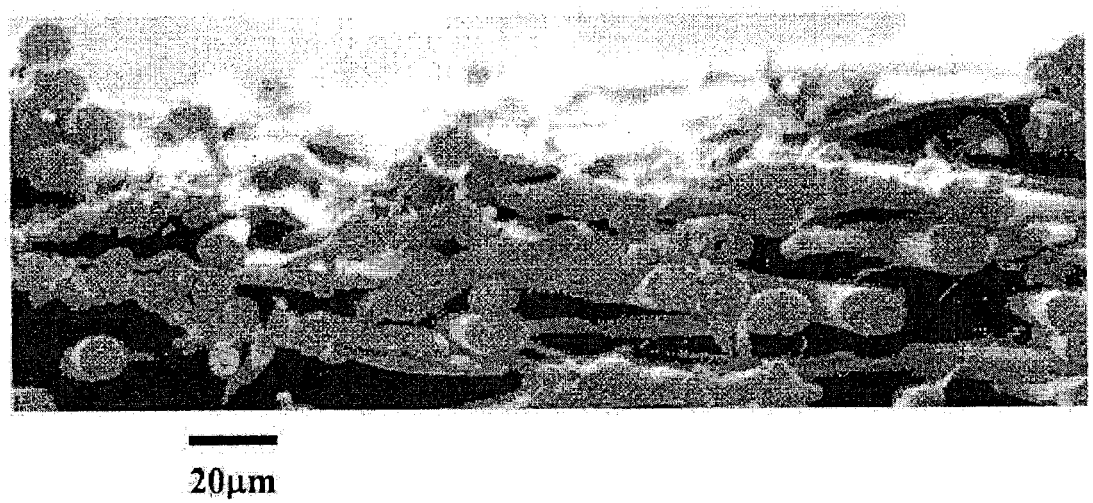
FIG. 2 is a scanning electron micrograph of a cross section of a three-dimensional structure of a porous electrode substrate obtained in Example 1 not having a three-dimensional entangled structure.
Figure 3A:
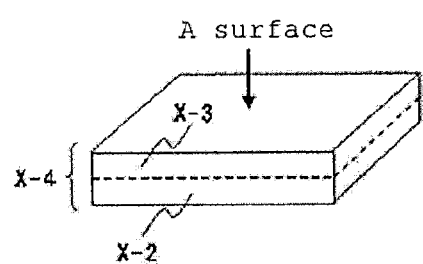
FIG. 3(a) is a view illustrating an observation view (A surface) of the porous electrode substrate obtained in Example 1, and (b) is a scanning electron micrograph of the A surface.
Figure 3B:
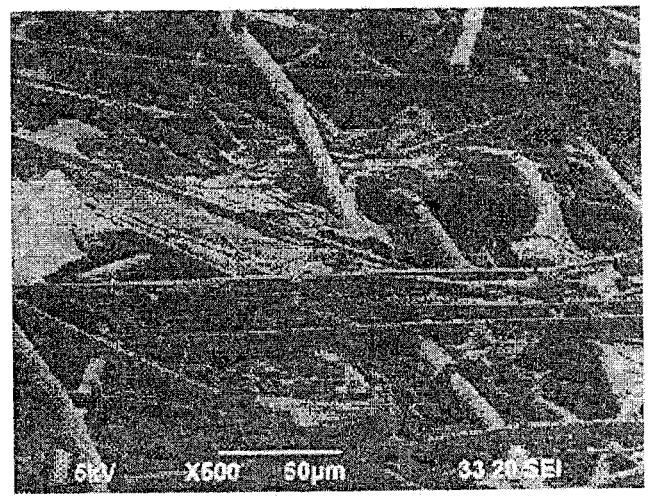
Figure 4A:
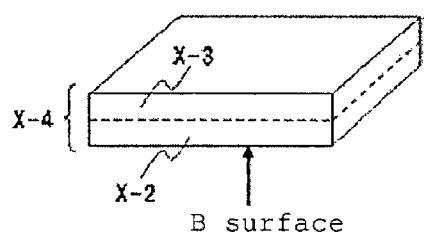
FIG. 4(a) is a view illustrating an observation view (B surface) of the porous electrode substrate obtained in Example 1, and (b) is a scanning electron micrograph of the B surface.
Figure 4B:
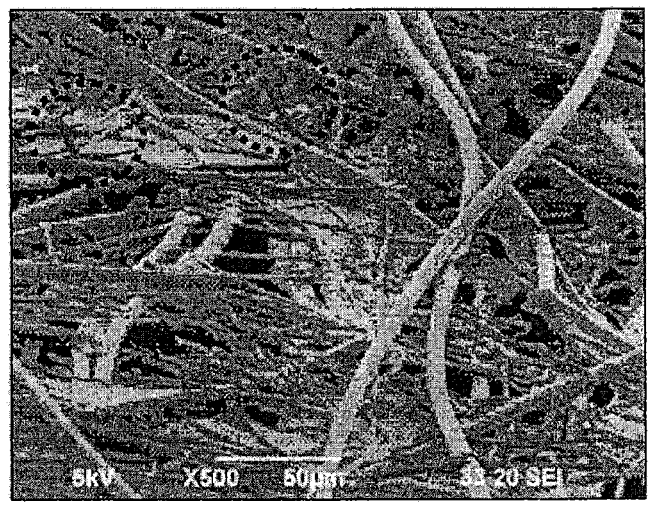

The obtained porous electrode substrate had almost no in-plane shrinking during the carbonization treatment, the undulation was small at no more than 2 mm and thus the surface smoothness was favorable, and the gas permeability, thickness and through-plane electric resistance were each favorable. The total content of the three-dimensional mesh-like carbon fibers (B) and two-dimensional mesh-like carbon fibers (C) was 24% by mass. In addition, scanning electron micrographs of cross sections of the obtained porous electrode substrate are shown in FIG. 1 (cross section of three-dimensional structure having three-dimensional entangled structure) and FIG. 2 (cross section of three-dimensional structure not having three-dimensional entangled structure). In addition, scanning electron micrographs of front and back surfaces of the obtained porous electrode substrate are shown in FIGS. 3 and 4. In FIG. 1, it could be confirmed that the short carbon fibers (A) are bonded by the three-dimensional mesh-like carbon fibers (B), and in FIG. 2, it could be confirmed that the short carbon fibers (A) are bonded by the two-dimensional mesh-like carbon fibers (C). Since the A surface does not have an entangled structure in FIG. 3, it could be confirmed that fluffing of the short carbon fibers (A), carbonized acrylic fibers, is suppressed. On the other hand, since the B surface has an entangled structure, fibers projecting from the surface could be observed in FIG. 4 (locations with round border). The OCV of a unit cell using this porous electrode substrate was high at 0.902 V, and the damage to the polymer electrolyte membrane upon incorporating in the fuel cell was low. The above evaluation results are shown in Table 2 along with the basis weight of the porous electrode substrate.

Examples 2 and 3

Porous electrode substrates were obtained similarly to Example 1, except for setting the target basis weights of the precursor sheet X-2 having a three-dimensional entangled structure and the precursor sheet X-3 not having a three-dimensional entangled structure to 25 g/m² and 45 g/m² (Example 2), or 55 g/m² and 15 g/m² (Example 3), respectively. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Examples 4 and 5

Porous electrode substrates were obtained similarly to Example 1, except for setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 30 g/m$^2$, 30 g/m$^2$ and 60 g/m$^2$ (Example 4), or 20 g/m$^2$, 20 g/m$^2$ and 40 g/m$^2$ (Example 5), respectively. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 6

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 50:40:10. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 7

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 40:40:20, and setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 40 g/m$^2$, 40 g/m$^2$ and 80 g/m$^2$, respectively. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 8

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 30:50:20, and setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 45 g/m$^2$, 45 g/m$^2$ and 90 g/m$^2$, respectively. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 9

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 70:10:20, and setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 30 g/m$^2$, 30 g/m$^2$ and 60 g/m$^2$, respectively.

The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 10

A porous electrode substrate was obtained similarly to Example 1, except for setting the pressurized water stream jet pressure to 2 MPa (nozzle 1), 3 MPa (nozzle 2) and 2 MPa (nozzle 3). The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 11

A porous electrode substrate was obtained similarly to Example 1, except for setting the pressurized water stream jet pressure to 3.5 MPa (nozzle 1), 4.5 MPa (nozzle 2) and 3.5 MPa (nozzle 3). The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 12

A porous electrode substrate was obtained similarly to Example 1, except for using a polyacrylonitrile-based pulp (b'-1) in which several fibrils having a diameter of no more than 3 μm branch from a fibrous stem as the fibrillar carbon fiber precursor (b'). It should be noted that the polyacrylonitrile-based pulp (b'-1) was produced by jet solidification. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 13

A porous electrode substrate was obtained similarly to Example 12, except for repeatedly conducting the three-dimensional entanglement treatment by way of a pressurized water stream jet twice from the same surface. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 14

A porous electrode substrate was obtained similarly to Example 12, except for implementing the pressurized water stream jet again from the back surface after conducting the three-dimensional entanglement treatment by way of the pressurized water stream jet from the top surface. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 15

A porous electrode substrate was obtained similarly to Example 1, except for not using the fibrillar carbon fiber precursors (b'), and setting the mass ratio of the short carbon fibers (A) to short carbon fiber precursors (b) in the sheet-forming slurry to 50:50. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 16

A porous electrode substrate was obtained similarly to Example 1, except for not using the short carbon fiber precursors (b), and setting the mass ratio of the short carbon fibers (A) to fibrillar carbon fiber precursors (b') in the sheet-forming slurry to 50:50. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 17

A porous electrode substrate was obtained similarly to Example 16, except for using a polyacrylonitrile-based pulp (b'-1) in which several fibrils having a diameter of no more than 3 μm branch from a fibrous stem as the fibrillar carbon fiber precursor (b'). It should be noted that the polyacrylonitrile-based pulp (b'-1) was produced by jet solidification. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 18

A porous electrode substrate was obtained similarly to Example 1, except for interposing both surfaces of a hot press molded porous electrode substrate precursor sheet X-4 with stainless-steel punching plates coated with a silicone-based mold release agent, and then oxidation treating in a batch press machine in the atmosphere under conditions of 280° C. and 0.5 MPa, prior to the carbonization treatment. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 19

A porous electrode substrate was obtained similarly to Example 1, except for not having carried out hot press molding. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 20

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 20:30:50, and setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 45 g/m$^2$, 45 g/m$^2$ and 90 g/m$^2$, respectively. The obtained porous electrode substrate had an external appearance in which wrinkles were formed due to in-plane shrinking during the carbonization treatment; however, the undulation was small at 3 mm, the surface smoothness was also favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 21

A porous electrode substrate was obtained similarly to Example 1, except for setting the mass ratio of the short carbon fibers (A) to short carbon fiber precursors (b) to fibrillar carbon fiber precursors (b') in the sheet-forming slurry to 80:10:10, and setting the target basis weights of the precursor sheet X-2 having a three-dimensional entangled structure, the precursor sheet X-3 not having a three-dimensional entangled structure, and the porous electrode substrate precursor sheet X-4 layer stacking and integrating these to 30 g/m$^2$, 30 g/m$^2$ and 60 g/m$^2$, respectively.

The obtained porous electrode substrate had an external appearance in which wrinkles were formed due to in-plane shrinking during the carbonization treatment; however, the undulation was small at 3 mm, the surface smoothness was also favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 22

A porous electrode substrate was obtained similarly to Example 1, except for producing the layer stacked and integrated precursor sheet by separately producing the precursor sheet X-2 having a three-dimensional entangled structure and the precursor sheet X-3 not having a three-dimensional entangled structure, allowing to dry, and then overlapping the two and hot press molding in a batch press machine for 3 minutes under conditions of 180° C. and 3 MPa. It should be noted that the precursor sheet X-3 was produced similarly to the production method of X-1 in Example 1. The obtained porous electrode substrate had an external appearance in which wrinkles were formed due to in-plane shrinking during the carbonization treatment, the undulation was small at no more than 2 mm, the surface smoothness was also favorable, and the gas permeability, thickness and through-plane electric resistance were each favorable. In addition, the porous electrode substrate had a structure integrating and layer stacking a three-dimensional structure in which the short carbon fibers (A) are bonded by the three-dimensional mesh-like carbon fibers (B), and a three-dimensional structure in which the short carbon fibers (A) are bonded by the two-dimensional mesh-like carbon fibers (C). In addition, the damage to the polymer electrolyte membrane upon incorporating in the fuel cell was also small. The above evaluation results are shown in Table 2.

Example 23

In place of the defibrated slurries Sb and Sb' of the short carbon fiber precursors (b) and fibrillar carbon fiber precursors (b') a defibrated slurry was used that had been prepared similarly to the defibrated slurry Sb using polyvinyl alcohol (PVA) short fibers having an average fiber length of 3 mm (trade name: VBP105-1, manufactured by Kuraray Co., Ltd.). Then, the mass ratio of the short carbon fibers (A) to the polyvinyl alcohol (PVA) short fibers in the sheet-forming slurry was set to 80:20. Otherwise, the porous electrode substrate precursor sheet X-4 was obtained similarly to Example 5.

Subsequently, the porous electrode substrate precursor sheet X-4 impregnated by phenolic resin was obtained by impregnating the porous electrode substrate precursor sheet X-4 with a methanol solution of the phenolic resin (trade name: Phenolite J-325, manufactured by Dainippon Ink and Chemicals, Inc.), and allowing the methanol to sufficiently dry at room temperature, so that the mass ratio of the porous electrode substrate precursor sheet X-4 to nonvolatile components of the phenolic resin was 50:50. Subsequently, press-heat molding and carbonization treatment were performed at the same conditions of Example 1 to obtain a porous electrode substrate. The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, the porous electrode substrate had a structure integrating and layer stacking a three-dimensional structure having an entangled structure in which the short carbon fibers (A) are bonded by the carbon (D), and a three-dimensional structure not having an entangled structure in which the short carbon fibers (A) are bonded by the carbon (D). In addition, the damage to the polymer electrolyte membrane upon incorporating in the fuel cell was also small. The above evaluation results are shown in Table 2.

Example 24

(Production of Membrane-Electrode Assembly)

An MEA was obtained similarly to the technique described in the aforementioned OCV measurement method (evaluation method for damage to the polymer electrolyte membrane upon incorporating in the fuel cell), using two of the porous electrode substrates obtained in Example 1 as the porous carbon electrode base materials for the cathode and anode.

(Evaluation of Fuel Cell Characteristics of MEA)

The obtained MEA was interposed by two carbon separators having bellows-like gas channels to form a polymer electrolyte fuel cell (unit cell).

Evaluation of the fuel cell characteristics was performed by measuring the current density-voltage characteristics of this unit cell. Hydrogen gas was used as the fuel gas and air was used as the oxidizing gas. The temperature of the unit cell was set to 80° C., the fuel gas utilization rate was set to 60%, and the oxidizing gas utilization rate was set to 40%. In addition, humidification of the fuel gas and oxidizing gas was performed by passing the fuel gas and the oxidizing gas through bubblers at 80° C., respectively. As a result, the cell voltage of the fuel cell when the current density was 0.8 A/cm$^2$ was 0.644 V, and the internal resistance of the cell was 2.9 mΩ, which indicated favorable characteristics.

Comparative Example 1

A porous electrode substrate was obtained similarly to Example 1, except for not having conducted the three-dimensional entanglement treatment by way of a pressurized water stream jet. In other words, although the precursor sheet X-3 was formed on the precursor sheet X-1, since neither has a three-dimensional entangled structure, the target basis weights of both were totaled and indicated in the field of "basis weight of X-3" in Table 2.

The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable; however, the handling property of the porous electrode substrate precursor sheet X-4 greatly declined. In addition, three-dimensional mesh-like carbon fibers (B) were not observed in the porous electrode substrate, which had a structure in which the short carbon fibers (A) were bonded by the two-dimensional mesh-like carbon fibers (C). In addition, the damage to the polymer electrolyte membrane upon inserting in the fuel cell was small. The above evaluation results are shown in Table 2.

Comparative Example 2

A porous electrode substrate was obtained similarly to Example 1, except for obtaining the porous electrode substrate precursor sheet X-4 by layer stacking and integrating the precursor sheet X-2 having a three-dimensional entangled structure and the precursor sheet X-3 not having a three-dimensional entangled structure, and then further conducting entanglement treatment by way of a pressurized water stream jet similarly to Example 1. In other words, since there was the result of the precursor sheet X-3 also having a two-dimensional entangled structure in addition to the precursor sheet X-2, the target basis weight of both were totaled and indicated in the field of "basis weight of X-2" in Table 2.

The obtained porous electrode substrate had almost no in-plane shrinking during the carbonization treatment, the undulation of the sheet was small at no more than 2 mm and thus the surface smoothness was favorable, and the gas permeability, thickness and through-plane electric resistance were each favorable. In addition, two-dimensional mesh-like carbon fibers (C) were not observed in the porous electrode substrate, which had a structure in which the short carbon fibers (A) were bonded by the three-dimensional mesh-like carbon fibers (B). However, the OCV of the unit cell using this porous electrode substrate was low at 0.883 V, and thus the damage to the polymer electrolyte membrane upon incorporating in the fuel cell was large. The above evaluation results are shown in Table 2.

Comparative Example 3

A porous electrode substrate was obtained similarly to Example 1, except for not using the short carbon fibers (A), and setting the mass ratio of the short carbon fiber precursors (b) to the fibrillar carbon fiber precursors (b') in the sheet-forming slurry to a mass ratio of 60:40. The obtained porous electrode substrate had a large amount of in-plane shrinkage during the carbonization treatment, and the sheet form could not be retained.

Comparative Example 4

In place of the defibrated slurries Sb and Sb' of the short carbon fiber precursors (b) and fibrillar carbon fiber precursors (b'), a defibrated slurry was used that had been prepared similarly to the defibrated slurry Sb using polyvinyl alcohol (PVA) short fibers having an average fiber length of 3 mm (trade name: VBP105-1, manufactured by Kuraray Co., Ltd.). Then, the mass ratio of the short carbon fibers (A) to the polyvinyl alcohol (PVA) short fibers in the sheet-forming slurry was set to 80:20. Otherwise, the porous electrode substrate was obtained similarly to Example 1. The three-dimensional mesh-like carbon fibers (B) and two-dimensional mesh-like carbon fibers (C) were not formed in the obtained porous electrode substrate, and the sheet form could not be retained.

TABLE 2

| | Precursor sheet | | | | | | | |
|---|---|---|---|---|---|---|---|---|
| | | | Fibrillar carbon fiber precursors (b') | | | | | |
| | Short carbon fibers (A) Parts | Short carbon fiber precursors (b) Parts | Carbon fiber precursors having large number of branched fibrils (b'-1) Parts | Short carbon fiber precursors to be fibrillated by beating (b'-2) Parts | Short PVA fibers Parts | Basis weight of X-4 $g/m^2$ | Basis weight of X-2 $g/m^2$ | Basis weight of X-3 $g/m^2$ |
| Example 1 | 50 | 30 | 0 | 20 | 0 | 70 | 35 | 35 |
| Example 2 | 50 | 30 | 0 | 20 | 0 | 70 | 25 | 45 |
| Example 3 | 50 | 30 | 0 | 20 | 0 | 70 | 55 | 15 |
| Example 4 | 50 | 30 | 0 | 20 | 0 | 60 | 30 | 30 |
| Example 5 | 50 | 30 | 0 | 20 | 0 | 40 | 20 | 20 |
| Example 6 | 50 | 40 | 0 | 10 | 0 | 70 | 35 | 35 |
| Example 7 | 40 | 40 | 0 | 20 | 0 | 80 | 40 | 40 |
| Example 8 | 30 | 50 | 0 | 20 | 0 | 90 | 45 | 45 |
| Example 9 | 70 | 10 | 0 | 20 | 0 | 60 | 30 | 30 |
| Example 10 | 50 | 30 | 0 | 20 | 0 | 70 | 35 | 35 |
| Example 11 | 50 | 30 | 0 | 20 | 0 | 70 | 35 | 35 |
| Example 12 | 50 | 30 | 20 | 0 | 0 | 70 | 35 | 35 |
| Example 13 | 50 | 30 | 20 | 0 | 0 | 70 | 35 | 35 |
| Example 14 | 50 | 30 | 20 | 0 | 0 | 70 | 35 | 35 |
| Example 15 | 50 | 50 | 0 | 0 | 0 | 70 | 35 | 35 |
| Example 16 | 50 | 0 | 0 | 50 | 0 | 70 | 35 | 35 |
| Example 17 | 50 | 0 | 50 | 0 | 0 | 70 | 35 | 35 |
| Example 18 | 50 | 30 | 0 | 20 | 0 | 70 | 35 | 35 |
| Example 19 | 50 | 30 | 0 | 20 | 0 | 70 | 35 | 35 |
| Example 20 | 20 | 30 | 0 | 50 | 0 | 90 | 45 | 45 |
| Example 21 | 80 | 10 | 0 | 10 | 0 | 60 | 30 | 30 |
| Example 22 | 50 | 30 | 0 | 20 | 0 | 70 | 35 | 35 |
| Example 23 | 80 | 0 | 0 | 0 | 20 | 40 | 20 | 20 |
| Comparative Example 1 | 50 | 30 | 0 | 20 | 0 | 70 | 0 | 70 |
| Comparative Example 2 | 50 | 30 | 0 | 20 | 0 | 70 | 70 | 0 |
| Comparative Example 3 | 0 | 60 | 0 | 40 | 0 | 70 | 35 | 35 |
| Comparative Example 4 | 80 | 0 | 0 | 0 | 20 | 70 | 35 | 35 |

TABLE 2-continued

| | Porous electrode substrate | | | | | |
|---|---|---|---|---|---|---|
| | Basis weight g/m² | Thickness μm | Total content of three-dimensional mesh-like carbon fibers (B) and two-dimensional mesh-like carbon fibers (C) % | Gas permeability ml/hr/cm2/Pa | Through-plane resistance mΩ · cm2 | Open circuit voltage (damage to Electrode membrane) V |
| Example 1 | 46 | 207 | 24 | 1100 | 12 | 0.902 |
| Example 2 | 46 | 205 | 24 | 1100 | 12 | 0.904 |
| Example 3 | 46 | 208 | 24 | 1100 | 11 | 0.900 |
| Example 4 | 39 | 177 | 24 | 1300 | 10 | 0.903 |
| Example 5 | 26 | 111 | 23 | 2200 | 6 | 0.900 |
| Example 6 | 45 | 199 | 22 | 1000 | 11 | 0.904 |
| Example 7 | 46 | 180 | 30 | 800 | 12 | 0.908 |
| Example 8 | 46 | 166 | 41 | 700 | 12 | 0.910 |
| Example 9 | 47 | 161 | 11 | 900 | 11 | 0.905 |
| Example 10 | 46 | 210 | 24 | 1200 | 11 | 0.903 |
| Example 11 | 46 | 211 | 24 | 1300 | 11 | 0.902 |
| Example 12 | 45 | 201 | 22 | 900 | 13 | 0.905 |
| Example 13 | 45 | 203 | 22 | 1000 | 13 | 0.906 |
| Example 14 | 45 | 200 | 22 | 1000 | 13 | 0.905 |
| Example 15 | 45 | 198 | 23 | 1100 | 12 | 0.902 |
| Example 16 | 46 | 200 | 23 | 1000 | 12 | 0.904 |
| Example 17 | 46 | 197 | 23 | 900 | 14 | 0.901 |
| Example 18 | 48 | 206 | 27 | 1100 | 11 | 0.904 |
| Example 19 | 46 | 215 | 24 | 1500 | 13 | 0.900 |
| Example 20 | 41 | 155 | 56 | 500 | 12 | 0.911 |
| Example 21 | 42 | 145 | 5 | 900 | 11 | 0.906 |
| Example 22 | 46 | 203 | 24 | 1000 | 12 | 0.903 |
| Example 23 | 48 | 195 | 0 | 800 | 6 | 0.904 |
| Comparative Example 1 | 46 | 205 | 24 | 1100 | 12 | 0.903 |
| Comparative Example 2 | 46 | 209 | 24 | 1200 | 12 | 0.883 |
| Comparative Example 3 | — | — | — | — | — | — |
| Comparative Example 4 | — | — | — | — | — | — |

The invention claimed is:

1. A porous electrode substrate, comprising:
a first structure comprising a plurality of first short carbon fibers, the first short carbon fibers bonded to each other by carbon such that the first structure is formed; and
a second structure comprising a plurality of second short carbon fibers, the second short carbon fibers bonded to each other by carbon such that the second structure is formed,
wherein
an average of angles formed by each of the first short carbon fibers and a surface of the first structure is 3° or more, or a maximum angle formed by each of the first short carbon fibers and the surface of the first structure is 10° or more, and
an average of angles formed by each of the second short carbon fibers and a surface of the second structure is less than 3°, and a maximum angle formed by each of the second short carbon fibers and the surface of the second structure is less than 10°.

2. The porous electrode substrate according to claim 1, wherein
the first structure has a three-dimensional structure in which the first short carbon fibers are bonded by three-dimensional mesh-like carbon fibers, and
the second structure has a three-dimensional structure in which the second short carbon fibers are bonded by two-dimensional mesh-like carbon fibers.

3. A porous electrode substrate precursor sheet, comprising:
a first precursor sheet comprising a plurality of first short carbon fibers dispersed in the first precursor sheet, and at least one of a first short carbon fiber precursor and a first fibrillar carbon fiber precursor; and
a second precursor sheet comprising a plurality of second short carbon fibers dispersed in the second precursor sheet, and at least one of a second short carbon fiber precursor and a second fibrillar carbon fiber precursor,
wherein
an average of angles formed by each of the first short carbon fibers and a surface of the first precursor sheet is 3° or more, or a maximum angle formed by each of the first short carbon fibers and the surface of the first precursor sheet is 10° or more, and
an average of angles formed by each of the second short carbon fibers and a surface of the second precursor sheet is less than 3°, and a maximum angle formed by each of the second short carbon fibers and the surface of the second precursor sheet is less than 10°.

4. The porous electrode substrate precursor sheet according to claim 3,
wherein
a mass ratio of the first short carbon fibers to a total of the first short carbon fiber precursor and the first fibrillar carbon fiber precursor is from 20:80 to 80:20, and
a mass ratio of the second short carbon fibers to a total of the second short carbon fiber precursor and the second fibrillar carbon fiber precursor is from 20:80 to 80:20.

5. A membrane-electrode assemblyl, comprising:
the porous electrode substrate according to claim 1.

6. A polymer electrolyte fuel cell, comprising:
the membrane-electrode assembly according to claim 5.

7. The porous electrode substrate according to claim 1, wherein the first structure is stacked on the second structure such that the first and second structures form an integrated structure.

8. The porous electrode substrate precursor sheet according to claim 3, wherein the first precursor sheet is stacked on the second precursor sheet such that the first and second precursor sheets form an integrated structure.

9. The porous electrode substrate according to claim 2, wherein an average of angles formed by each of the three-dimensional mesh-like carbon fibers and a surface of the first structure is 3° or more, and an average of angles formed by each of the second-dimensional mesh-like carbon fibers and a surface of the second structure is less than 2°.

10. The porous electrode substrate according to claim 2, wherein a total content of the three-dimensional mesh-like carbon fibers and two-dimensional mesh-like carbon fibers is from 5 to 90% by mass.

11. The porous electrode substrate according to claim 1, wherein the porous electrode substrate has a basis weight of from 15 to 100 g/m$^2$.

12. The porous electrode substrate according to claim 1, wherein the porous electrode substrate has a thickness of from 50 to 300 μm.

13. The porous electrode substrate according to claim 3, wherein the porous electrode substrate precursor sheet has a thickness of from 20 to 400 μm.

\* \* \* \* \*